(12) United States Patent
Yamaguchi et al.

(10) Patent No.: US 8,934,385 B2
(45) Date of Patent: Jan. 13, 2015

(54) WIRELESS COMMUNICATION APPARATUS AND ELECTRONIC DEVICE

(71) Applicant: Seiko Epson Corporation, Tokyo (JP)

(72) Inventors: Eiichiro Yamaguchi, Nagano (JP); Shunsuke Koyama, Nagano (JP); Shintaro Nagasaki, Nagano (JP); Noriaki Wakabayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 106 days.

(21) Appl. No.: 13/650,696

(22) Filed: Oct. 12, 2012

(65) Prior Publication Data

US 2013/0094417 A1 Apr. 18, 2013

(30) Foreign Application Priority Data

Oct. 14, 2011 (JP) ................................. 2011-227060

(51) Int. Cl.
| | |
|---|---|
| *H04B 7/005* | (2006.01) |
| *H04B 1/44* | (2006.01) |
| *H04J 3/24* | (2006.01) |
| *H04W 52/38* | (2009.01) |
| *H04W 52/50* | (2009.01) |

(52) U.S. Cl.
CPC .............. *H04W 52/38* (2013.01); *H04W 52/50* (2013.01)
USPC ............................ 370/278; 370/282; 370/474

(58) Field of Classification Search
CPC ..... H04W 52/04; H04W 52/38; H04W 52/50; H04W 56/0015
USPC .................. 370/278, 282, 329, 338, 390, 474
See application file for complete search history.

(56) References Cited

U.S. PATENT DOCUMENTS

| | | | | |
|---|---|---|---|---|
| 6,148,205 | A * | 11/2000 | Cotton ........................ | 455/435.1 |
| 6,856,789 | B2 * | 2/2005 | Pattabiraman et al. ...... | 455/41.2 |
| 7,174,130 | B2 * | 2/2007 | Kurisko et al. ............. | 455/41.2 |
| 8,130,958 | B2 * | 3/2012 | Schrum, Jr. ................. | 380/270 |
| 8,442,437 | B1 * | 5/2013 | Beard et al. ................. | 455/41.2 |
| 2008/0003978 | A1 * | 1/2008 | Sengupta et al. ............ | 455/410 |
| 2009/0143012 | A1 * | 6/2009 | Jeon ............................. | 455/41.2 |
| 2010/0150067 | A1 * | 6/2010 | Penisoara et al. ........... | 370/328 |
| 2010/0254431 | A1 * | 10/2010 | Derr et al. .................... | 375/133 |

FOREIGN PATENT DOCUMENTS

| | | |
|---|---|---|
| JP | 2011-026872 A | 2/2011 |
| JP | 2011-155386 A | 8/2011 |

* cited by examiner

*Primary Examiner* — Redentor Pasia
(74) *Attorney, Agent, or Firm* — Global IP Counselors, LLP

(57) ABSTRACT

A wireless communication apparatus includes a transmitter circuit whose transmission power is set variably, a wireless communication section having a receiver circuit, and a processing section that executes a control of the wireless communication section. The processing section sets the transmission power of the transmitter circuit to a first transmission power when it executes normal data communication and sets the transmission power of the transmitter circuit to a second transmission power smaller than the first transmission power when it executes a pairing process.

7 Claims, 13 Drawing Sheets

NORMAL DATA COMMUNICATION

UNIQUE ADDRESS
TRANSMISSION POWER PW1 (STRONG)

FIND PACKET

GLOBAL ADDRESS
TRANSMISSION POWER PW2 (WEAK)

COMMUNICATION SETTING PACKET

GLOBAL ADDRESS
TRANSMISSION POWER PW1 (STRONG)

UNIQUE ADDRESS
COMMUNICATION FREQUENCY

| Channel Number | Communication Frequency | Device ID mod 8 |
|---|---|---|
| 1 | 2402 | 0 |
| 2 | 2404 | 1 |
| 3 | 2406 | 2 |
| 4 | 2408 | 3 |
| 5 | 2410 | 4 |
| 6 | 2412 | 5 |
| 7 | 2414 | 6 |
| 8 | 2416 | 7 |
Fig. 12A
| ch | | | | | | | | | | | | | | | |
|---|---|---|---|---|---|---|---|---|---|---|---|---|---|---|---|
| 1 | 2402 | 2 | 2404 | 3 | 2406 | 4 | 2408 | 5 | 2410 | 6 | 2412 | 7 | 2414 | 8 | 2416 |
| 9 | 2422 | 10 | 2424 | 11 | 2426 | 12 | 2428 | 13 | 2430 | 14 | 2432 | 15 | 2434 | 16 | 2436 |
| 17 | 2442 | 18 | 2444 | 19 | 2446 | 20 | 2448 | 21 | 2450 | 22 | 2452 | 23 | 2454 | 24 | 2456 |
| 25 | 2462 | 26 | 2464 | 27 | 2466 | 28 | 2468 | 29 | 2470 | 30 | 2472 | 31 | 2474 | 32 | 2476 |
| ID%8=0 | | ID%8=1 | | ID%8=2 | | ID%8=3 | | ID%8=4 | | ID%8=5 | | ID%8=6 | | ID%8=7 | |
DEFAULT CHANNEL
SCAN CHANNEL
Fig. 12B

WIRELESS COMMUNICATION APPARATUS AND ELECTRONIC DEVICE

CROSS-REFERENCE TO RELATED APPLICATIONS

This application claims priority to Japanese Patent Application No. 2011-227060 filed on Oct. 14, 2011. The entire disclosure of Japanese Patent Application No. 2011-227060 is hereby incorporated herein by reference.

BACKGROUND

1. Technical Field

The invention relates to a wireless communication apparatus and an electronic device.

2. Background Technology

In recent years, wireless communication apparatuses that use Bluetooth (registered trademark) and other such representative short-range wireless formats are garnishing lots of attention. An example of a well-known technology for a wireless communication apparatus is disclosed in Patent Document 1.

When an electronic device internally equipped which such a short-range wireless communication apparatus is first used, pairing is executed to identify another device to connect to and to establish a communication connection with the other device.

However, in the well-known pairing step, the transmission power of a transmitter circuit in the wireless communication apparatus is increased and a carrier wave is transmitted across a wide area in order to find another device to pair with. As a result, still other devices existing in the area receive the carrier wave and all of the devices that received the carrier wave issue a response. When responses from a plurality of devices are detected, there is a possibility that pairing will occur with respect to a device not intended by the user or that the pairing communication will fail due to inter-signal interference.

Japanese Laid-open Patent Application No. 2011-155386 (Patent Document 1), is an example of the related art.

SUMMARY

Problems to Be Solved by the Invention

The advantage of the invention is to provide, through several aspects of the invention, a wireless communication apparatus and an electronic device that can improve a success rate of pairing with an intended device.

Means Used to Solve the Above-Mentioned Problems

One aspect of the invention relates to a wireless communication apparatus that includes a transmitter circuit whose transmission power is set variably, a wireless communication section that has a receiver circuit, and a processing section that executes a control process to control the wireless communication section. The processing section sets the transmission power of the transmitter circuit to a first transmission power when it executes normal data communication and sets the transmission power of the transmitter circuit to a second transmission power smaller than the first transmission power when it executes a pairing process.

With one aspect of the invention, during normal data communication, data communication is executed with the transmitter circuit set to the first transmission power. Meanwhile, during the pairing process, the transmission power of the transmitter circuit set to the second transmission power, which is smaller than the first transmission power used during normal data communication. Thus, the range of the transmitted signals can be limited during pairing such that such problems as pairing with an unintended device that responded to the transmission and inter-signal interference resulting from responses coming from a plurality of devices can be prevented. As a result, the success rate of pairing with the intended device can be improved.

In one aspect of the invention, it is acceptable for the processing section to set the transmission power of the transmitter circuit to the second transmission power while it communicates a packet for finding a device to be paired with during an initial stage of the pairing process and, after the find packet has been communicated, to set the transmission power of the transmitter circuit to a third transmission power larger than the second transmission power and communicate a pairing process packet for executing the pairing process.

With this configuration, when a find packet is communicated, the range over which the find packet is transmitted can be limited by setting the smaller second transmission power and pairing with unintended devices that responded to the find packet can be prevented. Meanwhile, regarding a packet communicated for pairing after the find packet is communicated, a higher communication quality can be maintained during the pairing process by setting the transmission power to the larger third transmission power.

In one aspect of the invention, it is acceptable for the processing section to set a unique address that designates a specific paired device as a packet destination determining address in a packet used for normal data communication, and to set a global address that does not designate a specific device as the destination determining address in the find packet.

With this configuration, even if the physical inter-signal interference occurs during normal data communication, the interference can be eliminated by setting a unique address as the destination determining address. Meanwhile, a find packet can be transmitted in a manner that does not limit it to a specific device by setting a global address as a destination determining address for the find packet.

In one aspect of the invention, it is acceptable to configure the processing section such that after it has communicated the find packet, the processing section sets the transmission power of the transmitter circuit to the third transmission power, communicates a communication setting packet in which the global address has been set as the destination determining address, and sets the unique address using the communication setting packet.

Thus, the communication of the communication setting packet is conducted with the transmitter circuit set to the third transmission power, which is larger than the second transmission power used during communication of the find packet. As a result, the noise immunity of the communication setting packet can be improved and the communication quality can be improved during the unique address setting process.

In one aspect of the invention, it is acceptable for the processing section to be configured such that when a device to be paired with transmits a response packet after having received the search packet, the processing section sets the unique address based on a device ID set in the response packet.

With this configuration, since the unique address can be set based on the device ID transmitted from the device to be paired with in response to the find packet, a proper pairing process can be accomplished with respect to the device to be paired with.

In one aspect of the invention, it is acceptable for the processing section to be configured to set the unique address by receiving the response packet having a different response time in accordance with the device ID from a device to be paired with.

Thus, it is possible to reduce the occurrence of inter-signal interference of response packets transmitted in response to the find packet.

In one aspect of the invention, it is acceptable for an address holding register that holds the destination determining address to be provided and for the processing section to be configured such that the process of setting the unique address includes transmitting the communication setting packet having the unique address set in its payload to the device to be paired with and writing the unique address to the address holding register.

With this configuration, a unique address that will serve as the destination determining address can be communicated to the device to be paired with by transmitting the communication setting packet in which the unique address is set. Also, by holding the unique address in the address holding register, the unique address can be set as the destination determining address of the packet that the apparatus transmits to the device to be paired with.

In one aspect of the invention, it is acceptable for the processing section to set a communication frequency to be used in the payload of the communication setting packet transmitting the communication setting packet to the device to be paired with.

With this configuration, when reception conditions are poor, the occurrence of inter-signal interference can be prevented by changing the communication frequency.

In one aspect of the invention, it is acceptable for the processing section to write the global address to the address holding register when the pairing process ends.

Thus, in processing executed after the pairing process, the processing session starts with the global address set instead of the unique address. As a result, a situation in which a device to which the apparatus has been associated by pairing becomes fixed can be prevented.

In one aspect of the invention, it is acceptable for the processing section to be configured such that when normal data communication starts, the processing section communicates a communication setting packet in which the global address is set as the destination determining address.

Thus, a normal data communication session is started with the global address set instead of the unique address. As a result, a situation in which a device to which the apparatus has been paired becomes fixed can be prevented.

In one aspect of the invention, it is acceptable for the processing section to be configured such that after it sets the transmission power of the transmitter circuit to the second transmission power and communicates the find packet as a single packet, the processing section changes the transmission power of the transmitter circuit from the second transmission power to the third transmission power.

Thus, since the find packet is a single packet, then the probability that the device search will fail can be reduced even if the transmission power is small. Also, after the single find packet has been transmitted, stable packet transmission can be accomplished during the pairing process by setting the transmission power to the larger third transmission power.

In one aspect of the invention, it is acceptable for the wireless communication section to be configured to automatically transmit an acknowledgement packet and notify the processing section that receipt of the packet was successful when a packet is successfully received, and configured to notify the processing section that receipt of the packet has failed when a packet fails to be received a prescribed number of times.

With this configuration, the amount of time the processing section is occupied with packet processing can be decreased and the processing load of the processing section can be lightened.

In one aspect of the invention, in a case where a communication frequency to be used is set based on a device ID of devices, the devices are divided into first to Nth device groups based on the device IDs, and first to Nth communication frequencies are assigned respectively to the first to Nth device groups, it is acceptable for the processing section to communicate the find packet at each of the first to Nth communication frequencies.

With this configuration, the occurrence of inter-signal interference can be held to a minimum even while transmitting find packets at the smaller second transmission power.

Another aspect of the invention relates to an electronic device that includes any of the wireless communication apparatuses as explained above.

BRIEF DESCRIPTION OF THE DRAWINGS

Referring now to the attached drawings which form a part of this original disclosure:

FIGS. 12 A and 12 B illustrate a method of changing wireless communication frequencies.

DETAILED DESCRIPTION OF EXEMPLARY EMBODIMENTS

A preferred embodiment of the invention will now be explained in detail. The embodiment explained hereinafter does not unduly limit the content of the invention as presented in the claims, and not all of the constituent features explained in the embodiments are essential for achieving the advantage of the invention.

1. Constituent Features

Figure 1:
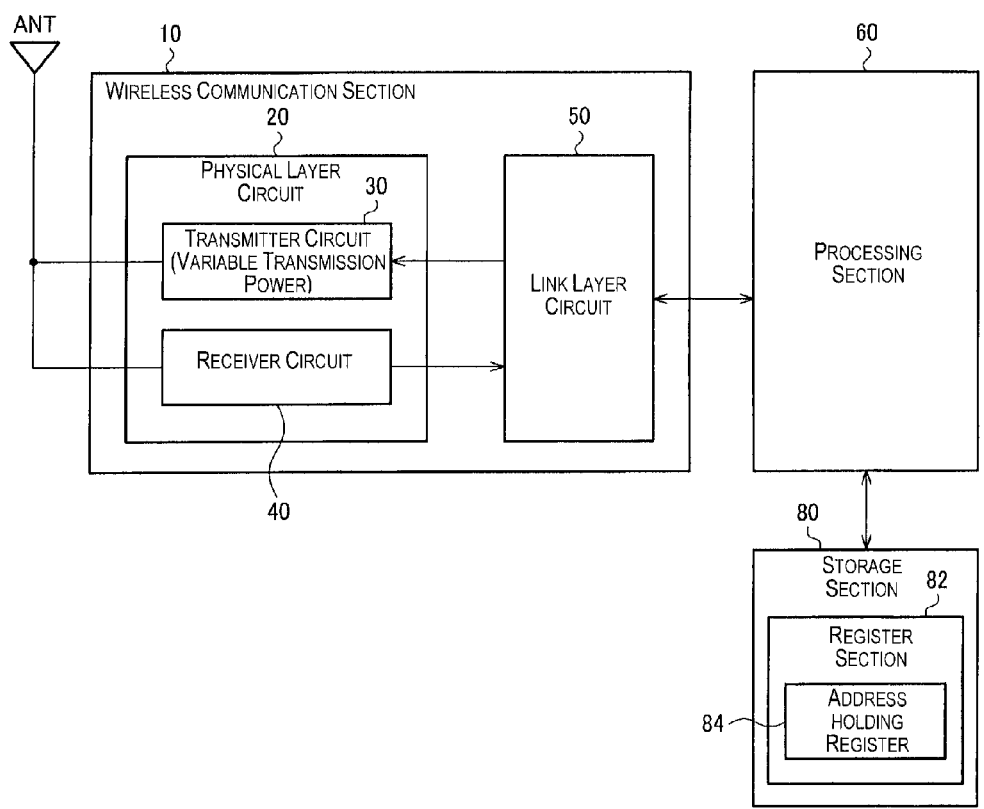
FIG. 1 is a block diagram showing constituent features of a wireless communication apparatus according to the embodiment.

FIG. 1 a block diagram showing constituent features of a wireless communication apparatus according to an embodiment. This wireless communication apparatus includes a wireless communication section 10 that has a transmitter circuit 30 and a receiver circuit 40 and a processing section 60 that executes control processing of the wireless communication section. A storage section 80 for storing various types of information can also be included.

More specifically, the wireless communication section 10 includes a physical layer circuit 20 and a link layer circuit 50. The physical layer circuit 20 is a circuit that executes physical layer processes of the wireless communication apparatus and executes processes related to physical connections between devices. This physical layer circuit 20 includes a transmitter circuit 30 having a power amplifier and a receiver circuit having a low-noise amplifier and exchanges information wirelessly with other devices through an antenna ANT. It is acceptable for the antenna ANT to be an inductor element inside an IC (integrated circuit) constituting the wireless communication apparatus or to be a component mounted externally to the IC.

The link layer circuit 50 is a circuit that executes link layer processes of the wireless communication apparatus and executes processes related to logical connections between devices. More specifically, the link layer circuit 50 executes a packet generating process, a packet analyzing process, a packet buffering process, and an error check process.

The processing section 60 executes control of the entire wireless communication apparatus and executes processes of layers above the link layer (e.g., network layer, transport layer, and session layer). The functions of the processing section 60 can be accomplished by a CPU or other type of processor, an ASIC or other hardware circuit, or a program that operates on such a hardware circuit.

The storage section 80 stores various types of data that are transferred by the payload of a packet and various types of control information for communication control and other controls. The storage section 80 has a register section 82 and the various types of control information for communication control and other controls are stored in the register section 82. The functions of the storage section 80 can be accomplished with an SRAM, a DRAM or other volatile memory, or with an EEPROM or other non-volatile memory.

Figure 2:
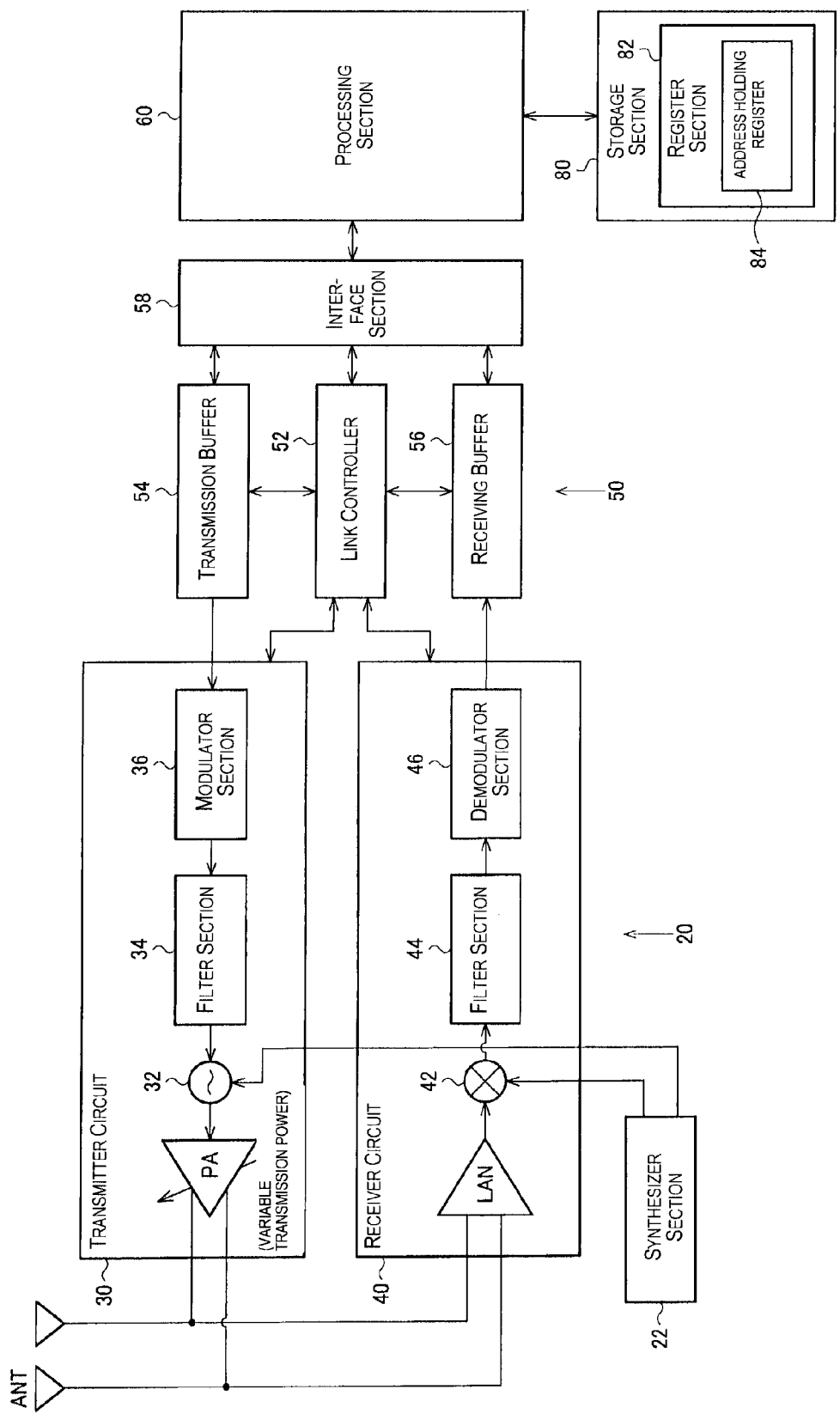
FIG. 2 is a block diagram showing more detailed constituent features of a wireless communication apparatus according to the embodiment.

FIG. 2 is a block diagram showing more detailed constituent features of a wireless communication apparatus according to the embodiment. The wireless communication apparatus according to this embodiment is not limited to the constituent features shown in the aforementioned FIG. 1 or the constituent features shown in the aforementioned FIG. 2. It is possible to configure variations that omit a portion of the constituent elements or add other constituent elements.

In FIG. 2, a transmitter circuit 30, a receiver circuit 40, and a synthesizer section 22 are provided as physical layer circuits 20. Also, a link controller 52, a transmission buffer 54, and a receiving buffer 56 are provided as link layer circuits 50.

The transmitter circuit 30 includes a power amplifier PA, a transmission signal generating section 32, a filter section 34, and a modulator section 36. The modulation section 36 receives transmission data from the transmission buffer 54 and executes such modulation processing as GFSK (Gaussian frequency shift keying) or FSK (frequency shift keying). The modulated transmission data is fed to the transmission signal generating section 32 through the filter section 34 of the transmission circuit. The transmission signal generating section 32 receives a carrier wave signal (e.g., 2.4 GHz) from the synthesizer section 22 and outputs a transmission signal based on the modulated transmission data to the power amplifier PA. The power amplifier PA amplifies the transmission signal (differential transmission signal) and sends the transmission signal to the antenna ANT.

The receiver circuit 40 includes a low noise amplifier LNA, a mixer section 42, a filter section 44, and a demodulator section 46. The low-noise amplifier LNA executes low-noise amplification of an RF reception signal (differential reception signal) received from the antenna ANT. The mixer section 42 mixes the amplified reception signal with a signal (local signal or local frequency signal) from the synthesizer section 22 (a clock generating circuit, a PLL circuit, or a local frequency generating circuit) and executes a down conversion with respect to the reception signal. The receiver circuit filter section 44 filters the down-converted reception signal. More specifically, the filter section 44 executes a band pass filter process using a complex filter or the like and extracts a baseband signal while executing image rejection. The demodulating section 46 executes a demodulating process based on a signal from the filter section 44. For example, a signal modulated with GFSK or FSK at the transmission side is demodulated and the demodulated reception data is outputted to the receiving buffer 56.

The link controller 52 executes link layer processes. More specifically, the link controller 52 executes processes for generating transmission packets, analyzing received packets, checking for errors, and transmitting automatic acknowledgement replies. The transmission buffer 54 executes buffering of data (transmission packets) transmitted by the transmitter circuit 30. The receiving buffer 56 executes buffering of data (reception packets) received by the receiver circuit 40. An interface section 58 executes interface processing between the wireless communication section 10 and the processing section 60. The interface processing can be accomplished using, for example, an SPI (serial peripheral interface). For example, the processing section 60 controls communication processes of the wireless communication section 10 by executing register settings through the interface section 58.

2. Measurement System

Figure 3:
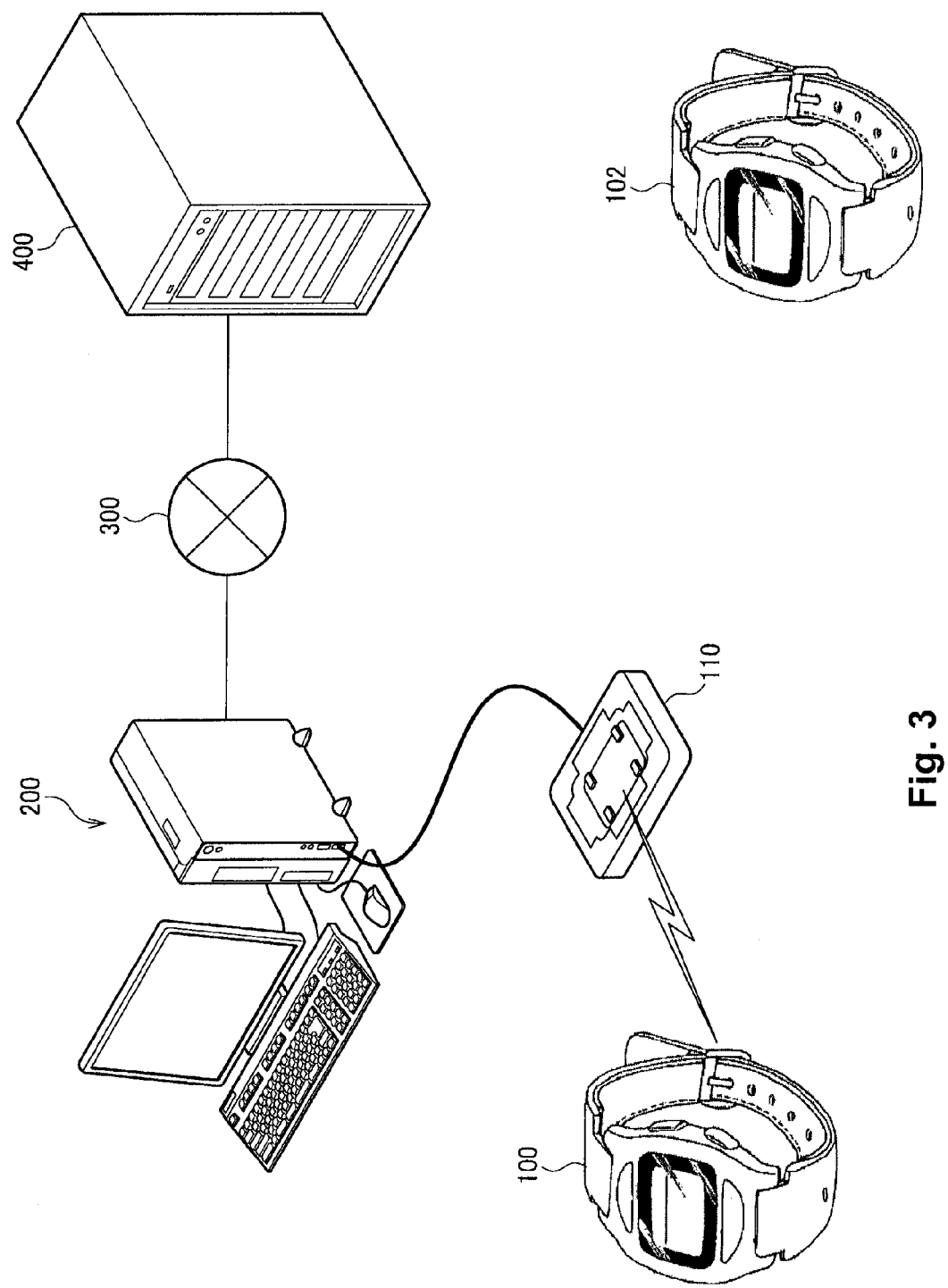
FIG. 3 is a system diagram showing a measurement system that utilizes a wireless communication apparatus according to the embodiment.

FIG. 3 is a system diagram showing a measurement system that utilizes a wireless communication apparatus according to the embodiment. The measurement system includes a wristwatch-type measuring device 100 (sensor device), a cradle 110, a PC (personal computer) 200, and a server system 400.

The measuring device 100, for example, detects a user's pulse and measures the user's calorie consumption, number of steps, and the like based on the detected pulse and the user's weight, height and age. It stores the obtained measurement data (exercise data) in an EEPROM (e.g., a flash memory) or other non-volatile storage unit.

The user operates a button of the measuring device 100 to initiate a transmission of measurement data. The measurement data stored in the non-volatile storage unit is transmitted to the cradle 110 by wireless communication. The cradle 110 is connected to the PC 200 by, for example, a USB or other wired connection, and the measurement data from the measuring device 100 is transmitted to the PC 200 through the wired connection.

The PC 200 is pre-installed with software for coordinating with the measuring device 100, and the measurement data from the measuring device 100 is transmitted to the external server system 400 through a network 300 by the software.

The network 300 is a communication path that utilizes, for example, the internet or a wireless LAN and can include a dedicated line for a direction connection, an Ethernet (registered trademark) or other type of LAN, or another type of communication network such as a telephone network, a cable network, or a wireless LAN.

The server system 400 is an exercise program service provided to the user through the network 300. That is, the server system 400 processes measurement data (exercise data) received from the PC 200 through the network 300, generates display data indicating, for example, calorie consumption information in the form of a time series, and transmits the display data to the PC 200 through the network 300. The display data is provided in, for example, HTML format and the PC 200 displays the display data on an LCD display or other display unit using a web browser or the like.

Figure 4:
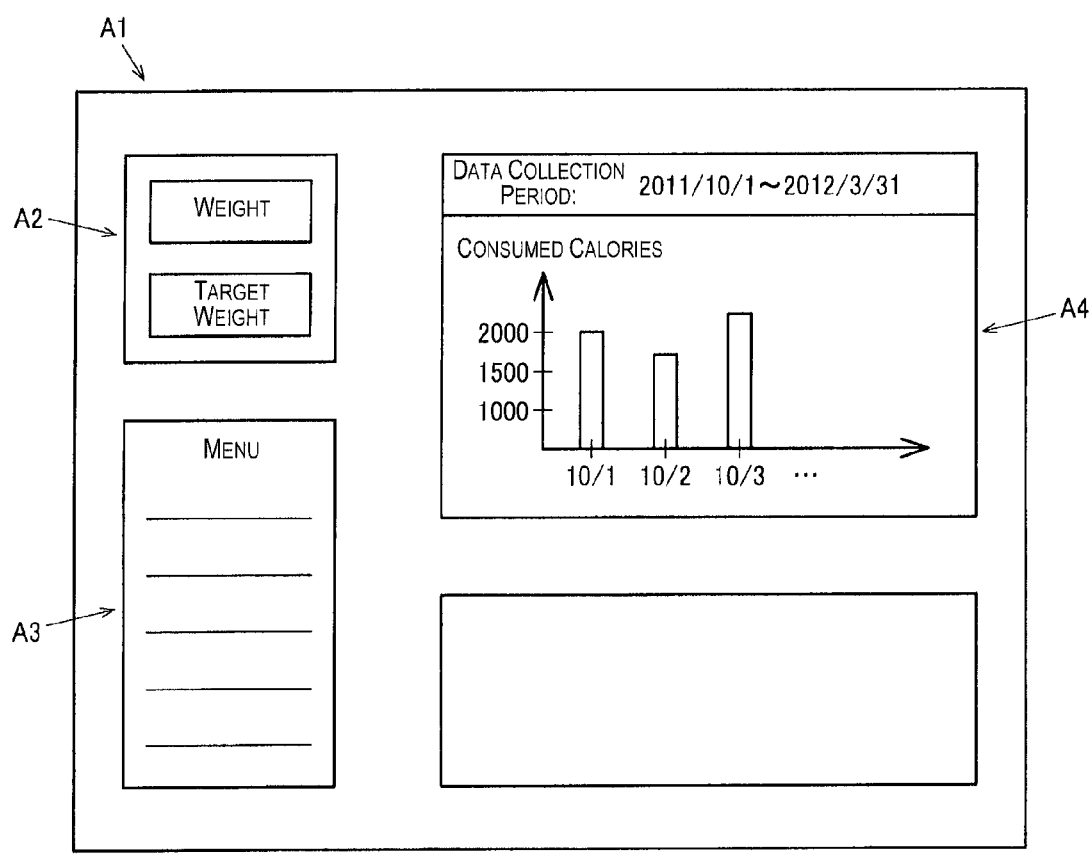
FIG. 4 is an example of a displayed image generated by the measurement system.

FIG. 4 shows an example of an image displayed on the display unit of the PC 200 by the measurement system in this embodiment. In FIG. 4, A1 indicates the display region of a web browser. A2 indicates a user settings information display region that displays such information as the user's current weight and target weight. A3 is a menu display region that displays a menu enabling the user to operate the exercise program service. A4 is an exercise data display region that displays calories consumed due to the user's exercise in a time series format.

3. Method of the Embodiment 3.1 Control of Transmission Power During Pairing

In the measurement system shown in FIG. 3, each of the measuring device 100 and the cradle 110 has a wireless communication apparatus according to the embodiment and exercise data and other measurement data are communicated wirelessly between these wireless communication apparatuses. In order to conduct such wireless communication of measurement data, pairing is executed when a user first uses the measuring device 100 in order to identify the devices to be connected and establish a communication connection between the devices (between the measurement device and the cradle). Pairing is an operation whereby devices to be connected are registered with each other and permission is granted for the registered devices to be connected to each other. Once pairing is finished and the devices to be connected have been registered with each other, the devices will recognize each other and a communication connection will be established automatically the second and subsequent times that wireless communication is conducted.

However, if the transmitter circuit 30 (power amp) shown in FIGS. 1 and 2 outputted the transmission signal at the maximum transmission power during pairing, then the carrier wave constituting the transmission signal would propagate over a wide area. Consequently, in addition to the measuring device 100 shown in FIG. 3 that the user intends to establish a communication connection with, the carrier wave would reach another measuring device 102 that the user does not intend to establish a communication connection with. Thus, both the measuring device 100 desired by the user and the other measuring device 102 will respond to the carrier wave. As a result, there is a possibility that the cradle will be paired with the measuring device 102 that the user does not desire to pair with or that the pairing process will fail due to inter-signal interference. For example, if both the measuring devices 100 and 102 respond at the same time, inter-signal interference will occur and the communication required for the pairing process will fail.

In order to solve this problem, this embodiment is configured to use a carrier wave having a weak transmission power (transmission strength) when the apparatus is searching for a device to pair with so that the area over which the carrier wave propagates is limited. By thus limiting the absolute number of devices that respond to the carrier wave, the embodiment makes it easier to accomplish pairing with the device intended by the user and achieves a high rate of success of pairing with the intended device. Then, by using carrier waves having the normal transmission power for packets transmitted after the device to be paired with is found, the embodiment prevents the communication quality of the pairing process itself from declining.

More specifically, the transmitter circuit 30 shown in FIGS. 1 and 2 is configured such that the transmission power can be set in a variable manner. For example, a voltage amplitude of transmission signals outputted from the transmitter circuit 30 can be variably controlled. The control of the transmission power is accomplished by, for example, controlling the power amplifier PA of the transmitter circuit 30. In such a case, the power amp PA could be, for example, provided with an amplifying section having a transistor for amplification and an LC load circuit connected in series with the amplifying section. The transmission power is then controlled by controlling at least one of the inductance value of the inductor and the capacitance value of the capacitor that make up the LC load circuit, thereby controlling the voltage amplitude of the transmission signal.

In this embodiment, the processing section 60 sets the transmission power of the transmitter circuit 30 (power amplifier) to the first transmission power to transmit data during normal data transmission. Meanwhile, during pairing, the processing section 60 sets the transmission power of the transmitter circuit 30 to the second transmission power, which is smaller than the first transmission power, to execute the pairing process as shown in step S2 of FIG. 5 and step S22 of FIG. 7 (explained later).

For example, if the first transmission power serves as a default transmission power set to 0 dB, the second transmission power might be set to ~18 dB. As a result, the transmission range of the carrier wave is, for example, approximately 10 m when using the default first transmission power and limited to approximately 1 m when using the second transmission power during pairing. Consequently, in the situation depicted in FIG. 3, pairing is not executed with respect to the measuring device 102 positioned farther from the cradle 110 and pairing is only execute with respect to the measuring device 100 that is positioned close to the cradle 110 (or mounted on the cradle 110). As a result, a pairing with respect to the measuring device 102 not intended by the user and a pairing failure caused by inter-signal interference can be prevented and a high rate of success of pairing with the intended device can be achieved.

The aforementioned normal data communication executed using the first transmission power refers to wireless communication of normal data (application data), e.g., measurement data in the case of FIG. 3. Also, it is not necessary for the transmission power to be set to the second transmission power during the entire duration of the pairing process; it is acceptable if the second transmission power is used during at least an initial period of the pairing process. Also, the processing section 60 can accomplish setting the transmission power by writing a transmission power setting value to a transmission power control register of the wireless communication section 10 through the interface section 58 shown in FIG. 2. Once such a transmission power setting value is written, the inductance value and/or the capacitance value of the LC load circuit of the power amplifier PA is set according to the setting value. As a result, the voltage amplitude of the transmission signal is controlled and, thus, the transmission power is controlled.

Additionally, more specifically, the processing section 60 sets the transmission power of the transmitter circuit 30 to the second transmission power, which is smaller than the first transmission power, when communicating the find packet (packet in which a find command is set) to the device to be paired with during the initial stage of the pairing process, as shown in step S2 of FIG. 5 and step S22 of FIG. 7 (explained later). The find packet is a packet for detecting whether a device that could be a candidate for pairing exists in an area surrounding the device that is transmitting the find packet.

Figure 5:
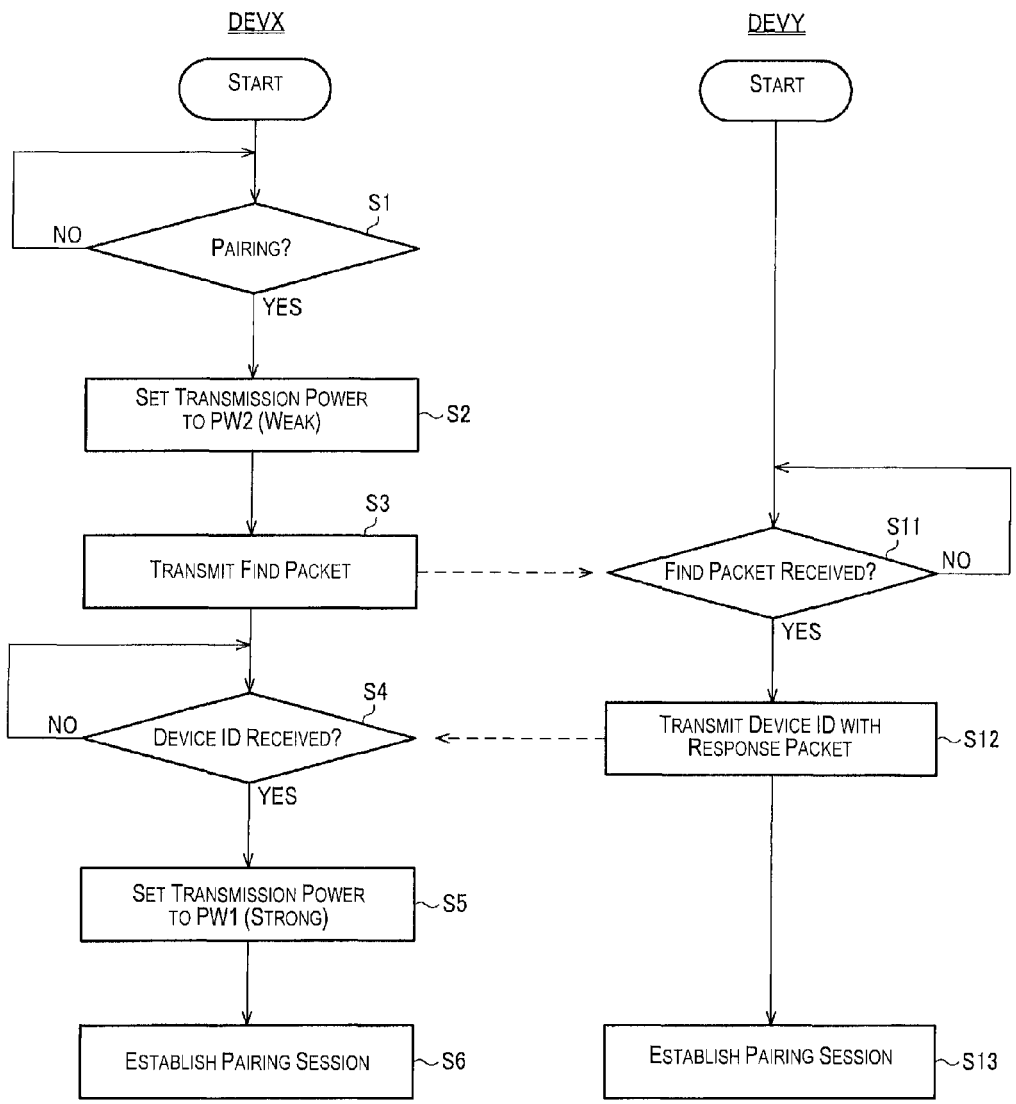
FIG. 5 is a flowchart explaining processing steps executed in the embodiment.
Figure 6A:
FIG. 6 A to D show examples of packet formats used in the embodiment.
Figure 6B:
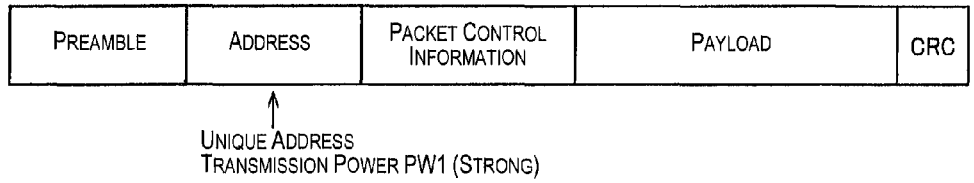
Figure 6C:
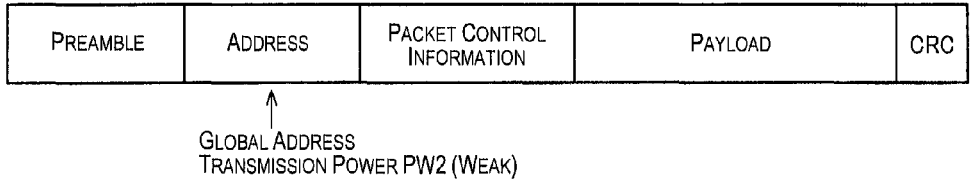
Figure 6D:
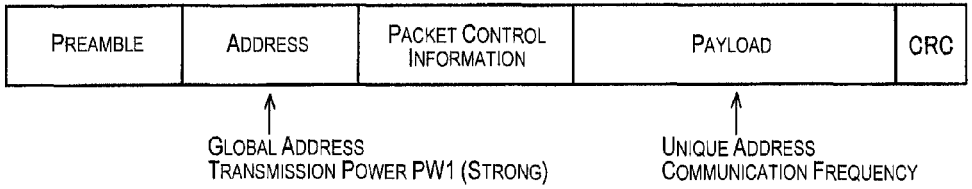
Figure 7:
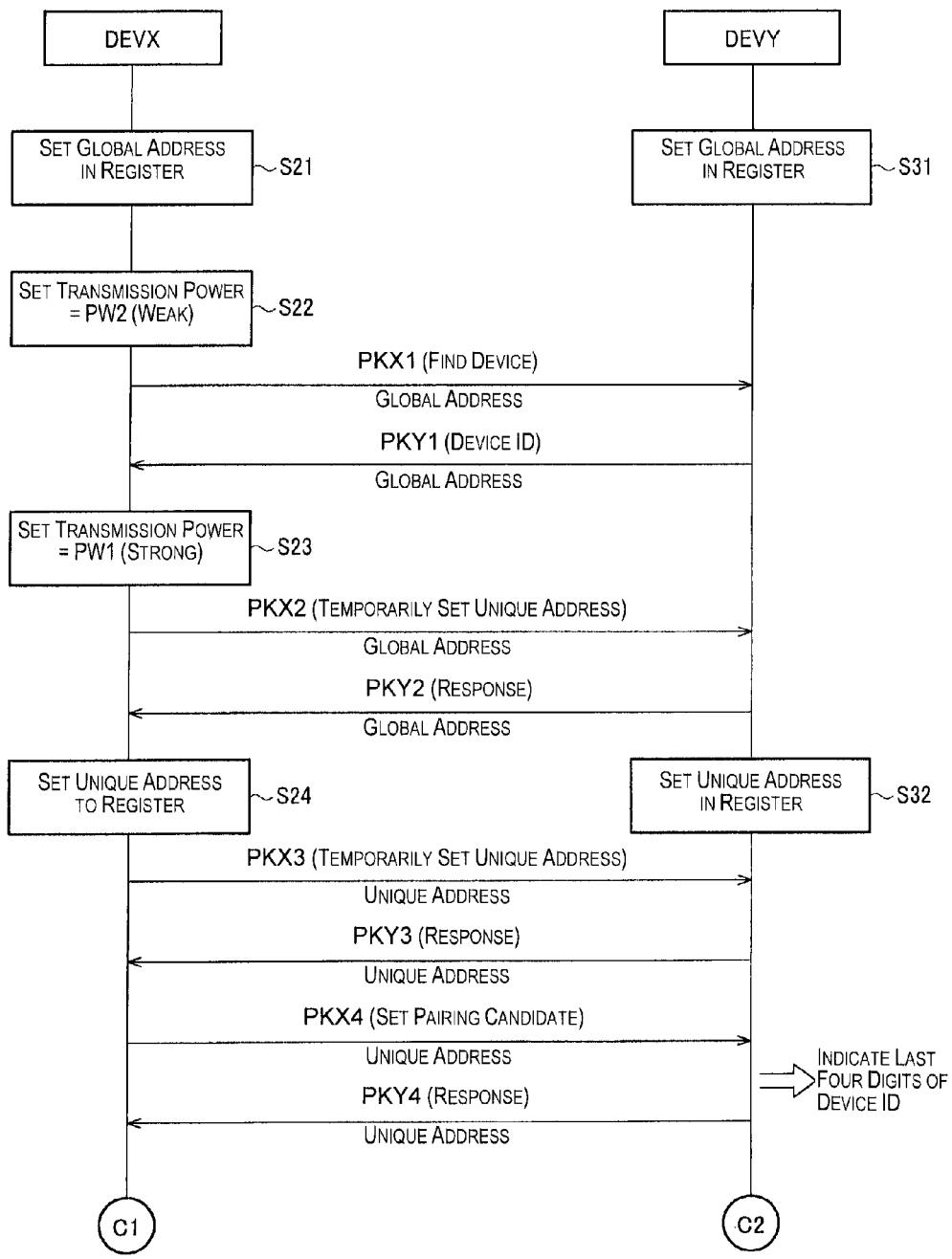
FIG. 7 is a communication sequence diagram explaining detailed operations executed in the embodiment during pairing.

Then, as shown in step S5 of FIG. 5 and step S23 of FIG. 7, the processing section 60 sets the transmission power of the transmitter circuit to the third transmission power (PW1) (which is larger than the second transmission power) after the find packet has been communicated and uses the third transmission power to conduct communications of pairing process packets, e.g., communications for establishing a session with the device to be paired with. In other words, the transmission power is set to the second transmission power during an initial packet transmission of the pairing process and set to the third transmission power (which is larger than the second transmission power) during subsequent packet transmissions of the pairing process.

After the find packet has found devices that will be candidates for pairing, the other packets used in the pairing process are packets for such tasks as exchanging necessary information between the devices, registering the devices to be connected with respect to each other, and establishing a connection between the devices to be connected.

It is acceptable for the third transmission power used during communication of the other pairing process packets to be the same as the first transmission power used during normal data communications or to be a transmission power lying between the first transmission power and the second transmission power.

Since the transmission power is set to the weak second transmission power when the find packet is communicated, the range of the carrier waves communicating the find packet is limited and the absolute number of devices issuing a reply packet in response to the find packet can be restricted. As a result, it is easier to pair with the device intended by the user and a high rate of success of pairing with the intended device can be achieved.

Meanwhile, the other packets (communication setting packets, etc.) communicated for the pairing process after the find packet has been communicated are transmitted at the third transmission power, which is larger than the second transmission power. Consequently, the communication quality does not decline during the pairing process and a stable pairing process can be accomplished.

As shown in FIG. 6 B, the processing section 60 sets a unique address designating a specific paired device as a destination and uses the unique address as a packet destination determining address with respect to packets used for normal data communication. That is, when normal data communication packets having measurement data or application data set in their payloads are communicated, the unique address is set as a destination determining address of the packets. When normal data communication is started, it is preferable to set the global address as the packet destination determining address.

Meanwhile, as shown in FIG. 6 C (explained later), the processing section 60 sets a global address that does not designate a specific device as a destination and uses the global address as the packet destination determining address with respect to the find packet. That is, the global address is set as the destination determining address instead of the unique address with respect to the find packet communicated during the pairing process.

The global address does not designate a specific device and is an address for transmitting packets as a broadcast. The global address is, for example, an address that is used commonly for all of the devices. Meanwhile, the unique address is an address that is set based on a device ID (identification) acquired from a response to the find packet and uniquely designates the paired device. The destination determining address is set, for example, in a field other than the payload of the packet and serves as an address (identifying information) by which a device that receives the packet determines if it is the device to which the packet was destined. The processing section 60 sets the destination determining address into, for example, a register of the wireless communication section 10 through the interface section 58. Thus, when a packet is being generated (assembled), the link controller 52 of the wireless communication section 10 sets the address field of the packet to the destination determining address that was written to the register by the processing section 60. The link controller 52 then executes a transmission of the packet.

By setting the unique address to packets transmitted during normal data communication as explained previously, normal data can be exchanged properly between the devices that have been associated with each other by pairing. Meanwhile, by setting the global address with respect to a find packet, the find packet can be transmitted to devices within an area surrounding the device that is issuing the find packet without specifying a destination and the pairing process can be started properly.

As shown in step S23 of FIG. 7 (explained later), after the find packet has been communicated, the processing section 60 sets the transmission power of the transmitter circuit 30 to the third transmission power (PW1) and executes communication of a communication setting packet in which the global address is set as the destination determining address. The communication setting packet serves to set the unique address.

Thus, the communication setting packet in which the global address is set as the destination determining address is transmitted to the device that responded to the find packet and it becomes possible to set a unique address to be used for communication with that device. Since the communication setting packet is transmitted at the larger third transmission power instead of the weaker second transmission power, the communication setting process can be accomplished reliably between the paired devices.

When a device to be paired with receives the find packet and transmits a response packet, the processing section 60 sets a unique address based on the device ID set in the response packet, as shown in step S24 of FIG. 7 (explained later). In other words, the processing section 60 transmits the find packet and, when it receives a response packet containing a device ID from a device to be paired with that received the find packet, the processing section 60 sets a unique address based on the device ID. For example, the processing section 60 sets a unique address including a total of 5 bytes: the four bytes of the device ID plus 0xE7. More specifically, when the processing section 60 receives the response packet containing the device ID, it calculates the unique address based on the device ID. Then, the processing section 60 transmits to the device to be paired with a communication setting packet in which a global address (e.g., 0xE7E7E7E7E7) is set as the destination determining address as explained previously, thereby setting a unique address between the apparatus and the device to be paired with.

Figure 10:
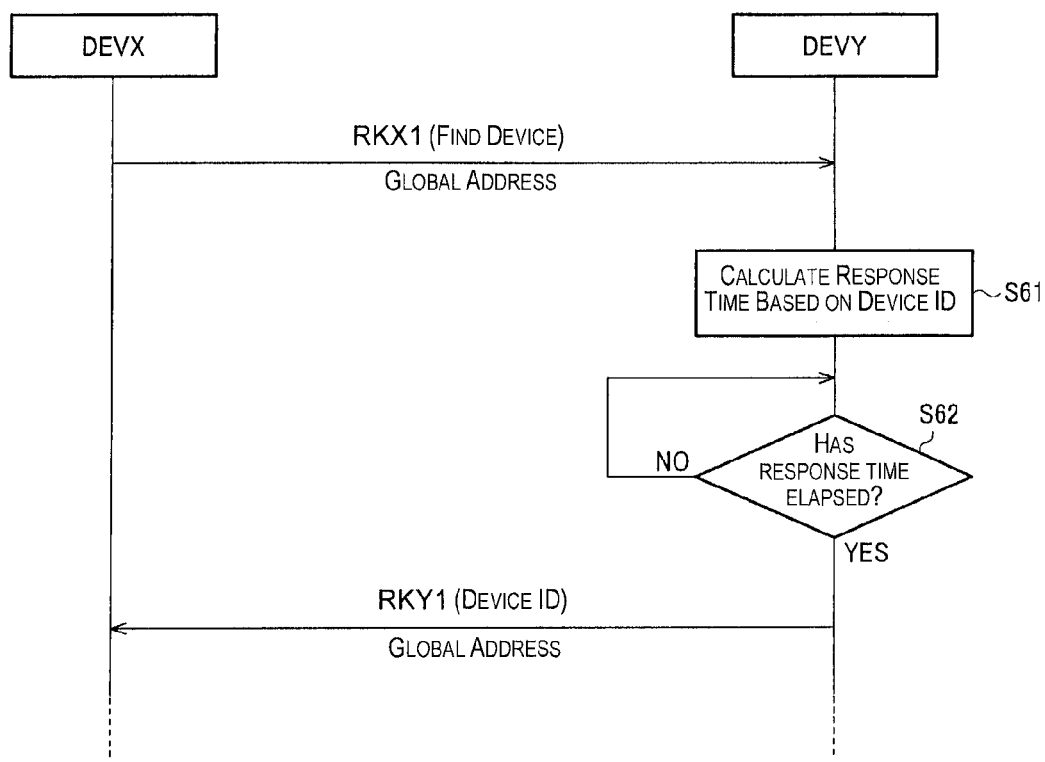
FIG. 10 illustrates a method of setting a response time of a response packet based on a device ID.
Figure 11A:
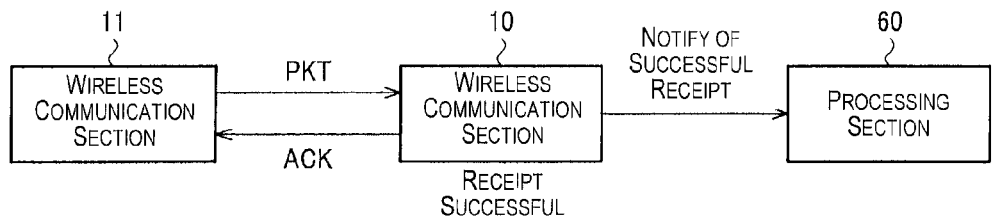
FIGS. 11 A and 11 B illustrate automatic reply processes for acknowledgement.
Figure 11B:
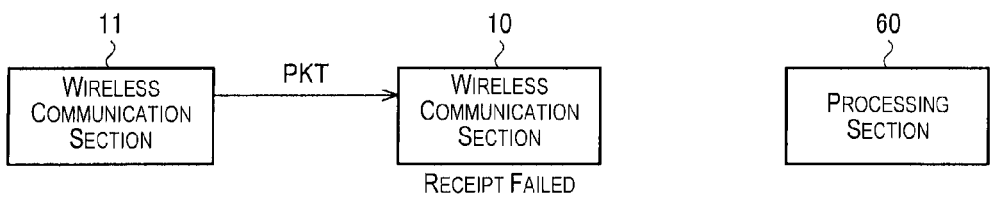
Figure 11B:
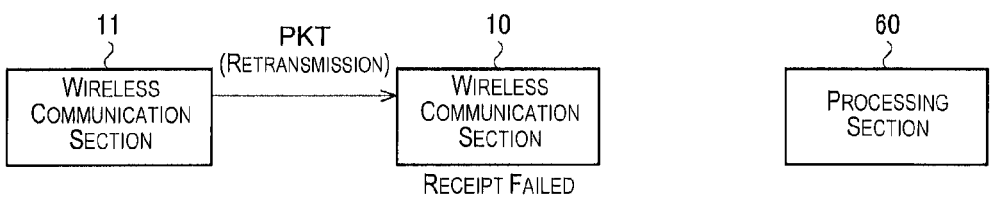
Figure 11B:
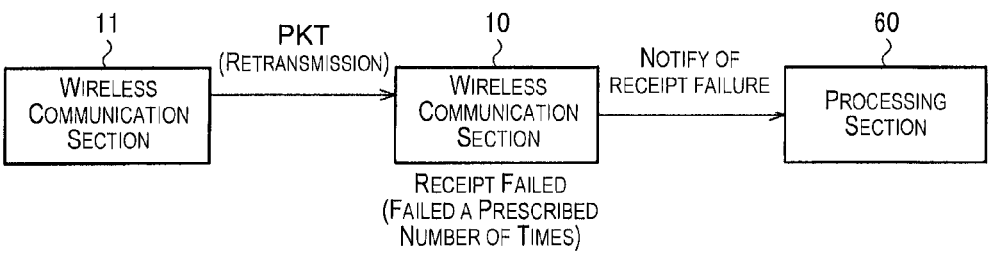

As shown in FIG. 10 (explained later), it is acceptable for the processing section 60 set the unique address by receiving response packets having different response times according to the device IDs from the devices to be paired with. That is, a device to be paired with that received the find packet would calculate a response time (wait time) based on the device ID and transmit a response packet containing the device ID after the calculated response time has elapsed. Then, the processing section 60 would receive the response packets having different response times according to the device ID and communicate a communication setting packet as explained previously, thereby setting a unique address.

As shown in FIG. 1 and FIG. 2, for example, an address holding register 84 for holding the destination determining address is provided in the storage section 80. The processing section 60 sets the unique address by transmitting the communication setting packet having the unique address set in its payload to the device to be paired with and, as shown in step S24 of FIG. 7, writing the unique address to the address holding register 84. That is, when it receives the response packet containing the device ID from the device to be paired with, the processing section calculates a unique address based on the device ID as explained previously and writes the calculated unique address to the address holding register 84 to hold the information. Also, as shown in FIG. 6 D (explained later), the processing section 60 transmits a communication setting packet having the calculated unique address set in its payload to the device to be paired with, thereby setting the unique address between the apparatus and the device to be paired with.

As shown in FIG. 6 D (explained later), it is also acceptable if the processing section 60 sets a communication frequency to be used in the communication setting packet to be transmitted to the device to be paired with. That is, the communication setting packet transmitted to the device to be paired with has a communication frequency to be used set in its payload in addition to the unique address. In this way, the communication frequency used to communicate with the device to be paired with can be set variably and the occurrence of inter-signal interference can be suppressed.

Figure 8:
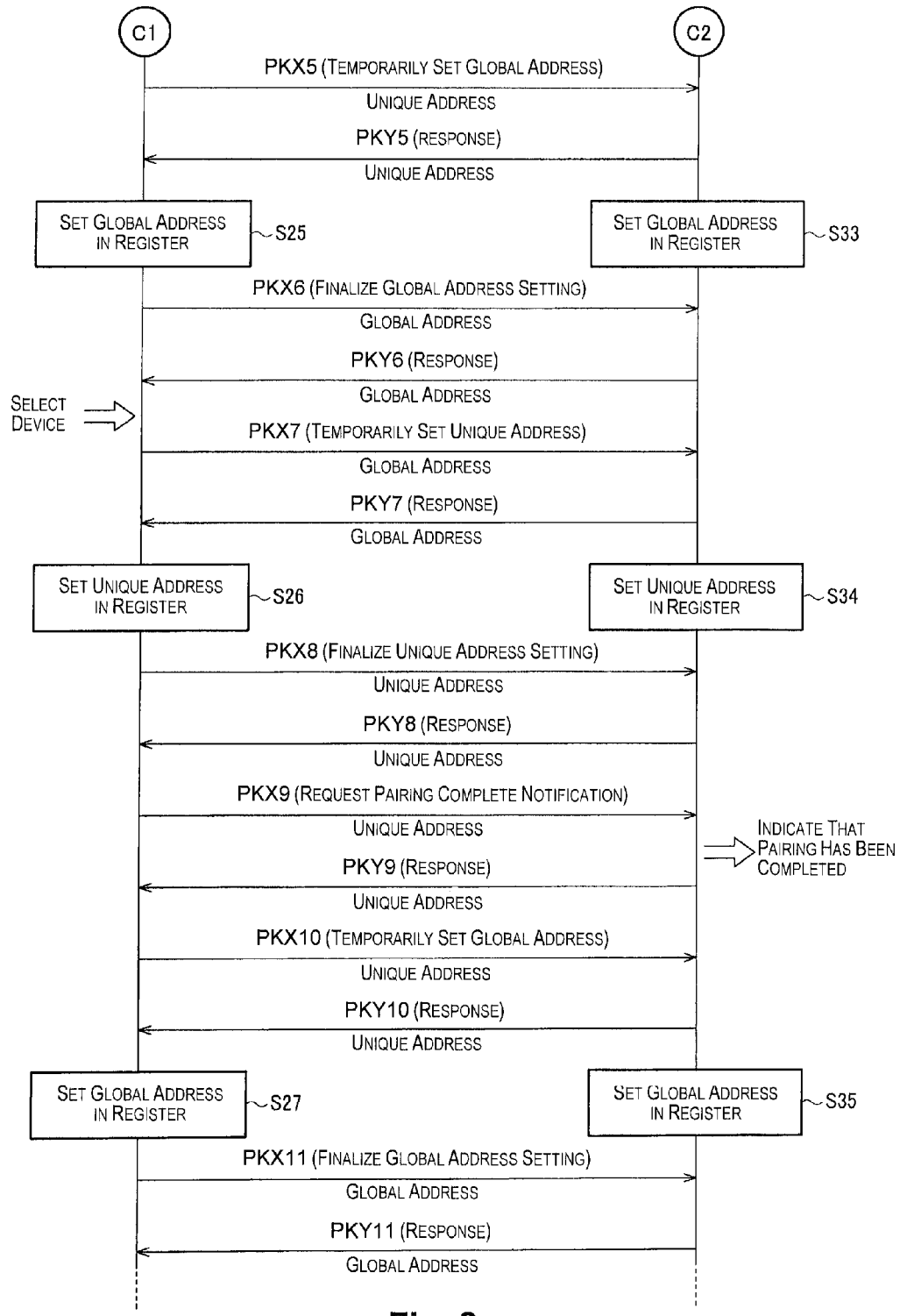
FIG. 8 is a communication sequence diagram explaining detailed operations executed in the embodiment during pairing.

As shown in step S27 of FIG. 8, the processing section 60 also writes the global address to the address holding register 84 when the pairing process ends (when a session ends). That is, the processing section 60 is configured to cancel the unique address and set the global address in the communication settings before ending the session. As shown in step S41 of FIG. 9 (explained later), when normal data communication will start (when a session will start), the processing section 60 executes communication of a communication setting packet having a global address set as a destination determining address. That is, when normal data communication will be started, the communication setting packet is communicated with the global address instead of the unique address.

With this aspect, a normal data communication session conducted after the pairing process is started with the global address set instead of the unique address. As a result, a situation in which a device to which the apparatus has been associated by pairing becomes fixed can be prevented. Thus, for example, as shown in FIG. 3, it becomes possible to pair the measurement device 100 with a home PC at one's home and to associate the same measurement device 100 with a company PC at one's company.

The processing section 60 sets the transmission power of the transmitter circuit 30 to the second transmission power and communicates a single find packet. That is, the processing section 60 only transmits one find packet at the weaker second transmission power. After the single find packet has been communicated, the processing section 60 switches the transmission power of the transmitter circuit 30 from the second transmission power to the third transmission power. That is, only the single find packet transmitted first is transmitted at the weak second transmission power and the packets transmitted afterward are transmitted at the third transmission power, which is larger than the second transmission power.

Thus, since the find packet is a single packet, then the probability that the device search will fail can be reduced even if the transmission power is weak. Also, after the single find packet has been transmitted, stable packet transmission can be accomplished during the pairing process by setting the transmission power to the larger third transmission power.

As illustrated in FIGS. 11 A and 11 B, the wireless communication section 10 automatically issues an acknowledgement (ACK) reply. More specifically, the wireless communication section 10 automatically sends an acknowledgement packet to the device being paired with when it succeeds in receiving a packet and notifies the processing section that the packet was successfully received. For example, the processing section 60 is notified by writing a status indicating the successful receipt to a register for notifying successful receipts. Meanwhile, the wireless communication section 10 notifies the processing section 60 that the receipt of a packet failed when a packet fails to be received a prescribed number of times.

That is, when receipt of a packet fails, the processing section 60 is not notified immediately with, for example, an automatic acknowledgement reply. Instead, the wireless communication section 10 waits for the paired device to send the packet again. Only when the packet has failed to be received a prescribed number of times set by the processing section 60 does the wireless communication section 10 notify the processing section 60 that receipt of the packet has failed. In this way, the processing section 60 can execute other processes until receipt of the packet fails a prescribed number of times and the processing section 60 is notified of the failure. Thus, the amount of time the processing section 60 is occupied with packet processing can be decreased and processing load of the processing section 60 can be lightened.

When the transmission power is set to the second transmission power to transmit the find packet, the wireless signal strength decreases and, consequently, it is more likely that the automatic acknowledgement reply will function and the packet will be retransmitted the prescribed number of times. However, if the find packet is a single packet, then a situation in which a long period of time is required to successfully transmit the find packet can be prevented even if the automatic acknowledgement reply causes retransmission to occur.

With this embodiment, as explained in FIGS. 12 A and 12 B (explained later), the communication frequency used is set based on the device ID of each of the devices. The devices are divided among first to Nth device groups based on the device IDs and first to Nth communication frequencies are assigned respectively to each of the device groups.

The processing section 60 executes communication of the find packet at each of the first to Nth communication frequencies. In this way, the occurrence of inter-signal interference can be held to a minimum even while transmitting find packets at the weaker second transmission power.

3.2 Processing Example and Packet Format Example

An example of the processing executed and an example of the packet format used in this embodiment will now be explained. FIG. 5 is a flowchart explaining the example of the processing executed in the embodiment.

In this example, DEVX indicates, for example, the cradle 110 (wireless communication apparatus inside the cradle) shown in FIG. 3 and DEVY indicates, for example, the measuring device 100 (the wireless communication apparatus inside the measuring device).

In the explanation that follows, it is assumed that the third transmission power set after the find packet has been communicated is the same as the first transmission power used during normal data communication. However, it is acceptable for the third transmission power to be a transmission power that is larger than the second transmission power used during communication of the find packet and smaller than the first transmission power used during normal data communication.

When the power is turned on to the device DEVX (cradle), it sets the transmission power to a power PW2 (weak) if pairing will be executed (S1 and S2). Then, the device DEVX transmits the find packet (S3). The find packet is a packet with a find command (search command, lookup command) set in the payload of the packet.

When the device DEVY (measurement device) receives the find packet, it transmits a response packet conveying a device ID (steps S11 and S12). More specifically, it transmits a response packet having the device ID set in the payload.

In a case where the measuring device 100 exists near the cradle 110 as shown in FIG. 3, the measurement device 100 can receive the find packet even with the weak transmission power PW2 and the measuring device 100 can reply to the cradle 110 with a response packet having its device ID set in the payload. Conversely, a device 102 positioned far from the cradle 110 cannot receive the find packet because the transmission power PW2 is too weak and, thus, the device 102 cannot send a reply conveying its device ID.

When the device DEVX (cradle) receives the response packet containing a device ID from the device DEVY (measuring device), it sets its transmission power to PW1 (strong) (steps S4 and S5). Then, the devices DEVX and DEVY execute packet communication for pairing and establish a pairing session (steps S6 and S13). More specifically, the devices execute a process to set a unique address based on the device ID received in step S4 and a process to display images for performing paired operations on display units of the devices. After the pairing process ends and the paired devices have been registered with each other, bringing the devices close together will cause a communication connection to be established automatically so that the devices can communicate measurement data and other normal data.

FIG. 6 A shows an example of the format of the packets communicated wirelessly between the devices. The packet shown in FIG. 6 A has fields for a preamble, an address, packet control information, a payload, and a CRC.

The preamble is a bit string that the demodulator of a receiving device uses to synchronize with incoming bit strings.

The address (identifying information) is an address for the receiving device and is used to determine the destination of the packet. This address is used for packet detection and to determine if the packet is a packet that should have been received by the receiving device in order to prevent inter-signal interference of packets. The processing section 60 sets this destination determining address into the address field of the packet by setting it to the register provided in the interface section 58 shown in FIG. 2.

The packet control information field is used for control of the packet and includes such fields as a payload length field and a PID (packet identify) field.

The payload field carries data communicated between the devices (application data) and various control information used by the processing section 60 and other higher-level layers. The CRC field is used to detect packet errors.

The preamble, the address, the packet control information, and the CTR fields of the packet shown in FIG. 6 A are used chiefly by the wireless communication section 10 (link controller). Meanwhile, the payload field is used chiefly by the processing section 60 and other upper-level layers.

As shown in FIG. 6 B, in this embodiment the destination determining address of a normal data communication packet (packet for transferring application data) is set to a unique address designating a specific device as a destination. As a result, data can be exchanged properly between devices associated with each other by pairing. As explained previously, packets for normal data communication are transmitted at the strong default transmission power PW1.

Meanwhile, as shown in FIG. 6 C, the destination determining address of a find packet transmitted in step S3 of FIG. 5 is set to a global address (broadcast address) that does not designate a specific device as a destination. As a result, the find command of the find packet can be conveyed to devices in a surrounding vicinity of the device transmitting the find packet without limiting the conveyance to a specific device to which the transmitting device has been associated by pairing. Also, the find packet is transmitted at the weak transmission power PW2, as explained previously. As a result, the conveyance of the find command is limited to devices in close proximity to the device transmitting the find packet and a situation in which the find command is conveyed to an unintended device can be prevented.

In this embodiment, after the find packet shown in FIG. 6 C is transmitted, a communication setting packet is communicated in which a global address is set as the destination determining address as shown in FIG. 6 D. Payload of the communication setting packet carries a unique address and a communication frequency. Thus, the communication packet shown in FIG. 6 D can accomplish setting a unique address. As a result, a unique address can be set for devices associated with each other by pairing and data can be exchanged properly during normal data communication like that shown in FIG. 6 B.

The communication setting packet shown in FIG. 6 D is transmitted at a transmission power (third transmission power) larger than the power transmission PW2 at which the find packet shown in FIG. 6 C is transmitted. In this way, after a pairing candidate device has been found with the find packet shown in FIG. 6 C, the transmission power is strengthened from the power PW2 to the power PW1 so that the normal communication setting packet shown in FIG. 6 D can be transmitted. By strengthening the transmission power when transmitting the communication setting packet, the various operations executed to establish a session during pairing can be accomplished in a stable fashion.

3.3 Detailed Processing Example

An example of the processing executed in this embodiment will now be explained in detail. FIG. 7 and FIG. 8 are communication sequence diagrams explaining detailed operations executed in the embodiment during pairing.

After the electric power is turned on, the devices DEVX and DEVY set a global address into a register (address holding register 84 shown in FIG. 2) (steps S21 and S31).

Next, the device DEVX (e.g., cradle) sets the transmission power to the weaker PW2 (S22). Then, the device DEVX transmits a device finding packet PKX1 having a fixed-value global address set as its destination determining address as shown in FIG. 6 C. A device find command is set in the payload of the find packet PKX1.

Thus, a device DEVY existing very close to the device DEVX receives the find packet PKX1 and replies with a response packet PKY1 containing a device ID. The response packet PKY1, too, has a global address set as the destination determining address.

Using the situation depicted in FIG. 3 as an example, the device DEVX is the cradle 110 and the device DEVY is the measuring device 100. The cradle 110 transmits the find packet PKX1 and the measuring device 100 positioned very close to the cradle 110 replies with the response packet PKY1. More specifically, the measuring device 100 transmits a response packet PKY1 having a device ID for the measuring device 100 set in the payload.

Meanwhile, since the transmission power is set the weaker power PW2, the measuring device 102 positioned far from the cradle 110 does not send a response packet PKY1. Thus, inter-signal interference caused by responses from unintended devices can be prevented during pairing. It is also acceptable for the device DEVY to transmit the response packet PKY1 with the transmission power set to the weaker power PW2. Although in this example the device DEVX is the cradle 110 and the device DEVY is the measuring device 100, it is acceptable for the device DEVX to be the measuring device 100 and the device DEVY to be the cradle 110.

Next, the device DEVX switches the transmission power from PW2 to PW1, thereby strengthening the transmission power (S23). As a result, range of the carrier waves is widened. The device DEVX then transmits a packet PKX2 for temporarily setting a unique address.

In this embodiment, the transmission power of the transmitter circuit 30 is set to the weak power PW2 when the device communicates the find packet PKX1 for finding a device to be paired with in the initial stage of the pairing process. After it communicates the find packet PKX1, the device sets the transmission power to the larger power PW1 and transmits pairing process packets (PKX2, PKX3, PKX4, etc.) to accomplish such tasks as establishing a session with the device to be paired with.

The packet PKX2 for temporarily setting the unique address is the communication setting packet shown in FIG. 6 D and has a global address set as the destination determining address. The packet PKX2 also has a unique address set in its payload. Thus, the device DEVX calculates a unique address based on the device ID contained in the packet PKY1 received from the device DEVY and sets the unique address into the payload of the packet PKX2. The device DEVY sends a response packet PKY2 when it receives the packet PKX2. The response packet PKY2 has a global address set as the destination determining address.

Thus, in this embodiment, the device DEVX (processing section) sets the unique address based on the device ID set in the response packet PKY1 when the device DEVY has transmitted a response packet PKY1 in after receiving the find packet PKX1.

Next, the device DEVX writes the unique address calculated based on the device ID to a register (address holding register 84) (S24). The device DEVY, too, writes the unique address set in the payload of the packet PKX2 to its own register (S32). As a result, the devices are paired together such that they can exchange information using the unique address.

Next, the device DEVX transmits a packet PKX3 for finalizing the unique address setting and the device DEVY transmits a response packet PKY3. The unique address written to the registers in steps S24 and S32 is set as the destination determining addresses of these packets PKX3 and PKY3.

Thus, in this embodiment, the process of setting the unique address is accomplished by the device DEVX (processing section) transmitting the communication setting packet PKX2 with the unique address set in the payload to the device DEVY to be paired with and writing the unique address to the register (address holding register) (S24). The device DEVX can also change the communication frequency by setting a communication frequency to be used in the payload of the communication setting packet and transmitting the communication setting packet to the device DEVY to be paired with.

Next, the device DEVX transmits a packet PKX4 for pairing candidate settings. When it receives the packet PKX4, the device DEVY displays the last four digits of the device ID on a display unit of the device DEVY. In the example shown in FIG. 3, the last four digits of the device ID are indicated on a liquid crystal display unit of the measuring device 100. The device DEVY then replies with a response packet PKY4. The packets PKX4 and PKY4 have the unique address set as the destination determining address.

Next, as shown in FIG. 8, the device DEVX transmits a packet PKX5 for temporarily setting a global address and the device DEVY transmits a response packet PKY5. The destination determining addresses of the packets PKX5 and PKY5 are set to the unique address. The devices DEVX and DEVY then set the global address, which is the default address, to the registers (S25 and S33).

Next, the device DEVX transmits a packet PKX6 for finalizing the global address setting and the device DEVY transmits a response packet PKY6. The destination determining addresses of the packets PKX6 and PKY6 are set to the global address.

In this embodiment, each time one process ends, the address setting is returned from the unique address to the global address. In this way, each time a process ends the association established using the unique address is dissolved such that the next process can begin with packet transmissions and responses that are executed using the global address.

A case in which a user selects the intended device from among a plurality of pairing candidate devices will be explained. For example, assume that both the measuring devices 100 and 102 shown in FIG. 3 are very close to the cradle 110. That is, the measuring devices 100 and 102 are both positioned within the transmission range of the weak transmission power PW2. Thus, both of the measuring devices 100 and 102 are found as pairing candidates. As a result, the user needs to select the intended measuring device 100 from between the measuring devices 100 and 102.

Next, the device DEVX transmits a packet PKX7 for temporarily setting a unique address and the device DEVY transmits a response packet PKY7. The destination determining addresses of the packets PKX7 and PKY7 are set to the global address. The devices DEVX and DEVY then set the temporarily set unique address to the registers (S26 and S34).

Next, the device DEVX transmits a packet PKX8 for finalizing the unique address setting and the device DEVY transmits a response packet PKY8. The destination determining addresses of the packets PKX8 and PKY8 are set to the unique address.

Next, the device DEVX transmits a packet PKX9 having a pairing complete display request command set in the payload. The device DEVY receives the packet PKX9 and displays a notification that pairing has been completed on the display unit of the device DEVY.

For example, assume the last four digits of the device ID of the measuring device 100 are "0055," the last four digits of the device ID of the measuring device 102 are "0080," and the measuring devices 100 and 102 are both positioned close to the cradle 110 when the find packet PKX1 is transmitted.

In such a case, when the cradle 110 transmits the pairing candidate setting packet PKX4 shown in FIG. 7 to the measuring devices 100 and 102, the measuring device 100 displays "0050" on its display unit and the measuring device 102 displays "0080" on its display unit. Also, a search result screen is displayed on the display unit of the PC 200 and indicates the existence of the measuring devices "0050" and "0080" as pairing candidate devices.

Then, the user selects the device ID "0050" of the measuring device 100, which is the device desired for pairing, from the search result screen displayed on the display unit of the PC 200. When the user executes the selection, the measuring device 100 is finalized as the device to be paired with and the packet PKX9 is transmitted to request the pairing complete display as shown in FIG. 8. As a result, a screen indicating that the pairing has been completed is displayed on the display unit of the measuring device 100.

Next, the device DEVX transmits a packet PKX10 for temporarily setting the global address and the device DEVY transmits a response packet PKY10. The destination determining addresses of the packets PKX10 and PKY10 are set to a unique address. The devices DEVX and DEVY then set the global address to the registers (S27 and S35).

Next, the device DEVX transmits a packet PKX11 for finalizing the global address setting and the device DEVY transmits a response packet PKY11. The destination determining addresses of the packets PKX11 and PKY11 are set to the global address.

In this embodiment, the device DEVX (processing section) sets the global address in the register (address holding register) when the pairing process ends. That is, when the pairing process ends, the address setting in the register is returned from the unique address to the global address. Thus, when the pairing process ends, the association created with the unique address is canceled and packet transmissions and responses are made using the global address such that the next normal data communication or other process can be started.

Figure 9:
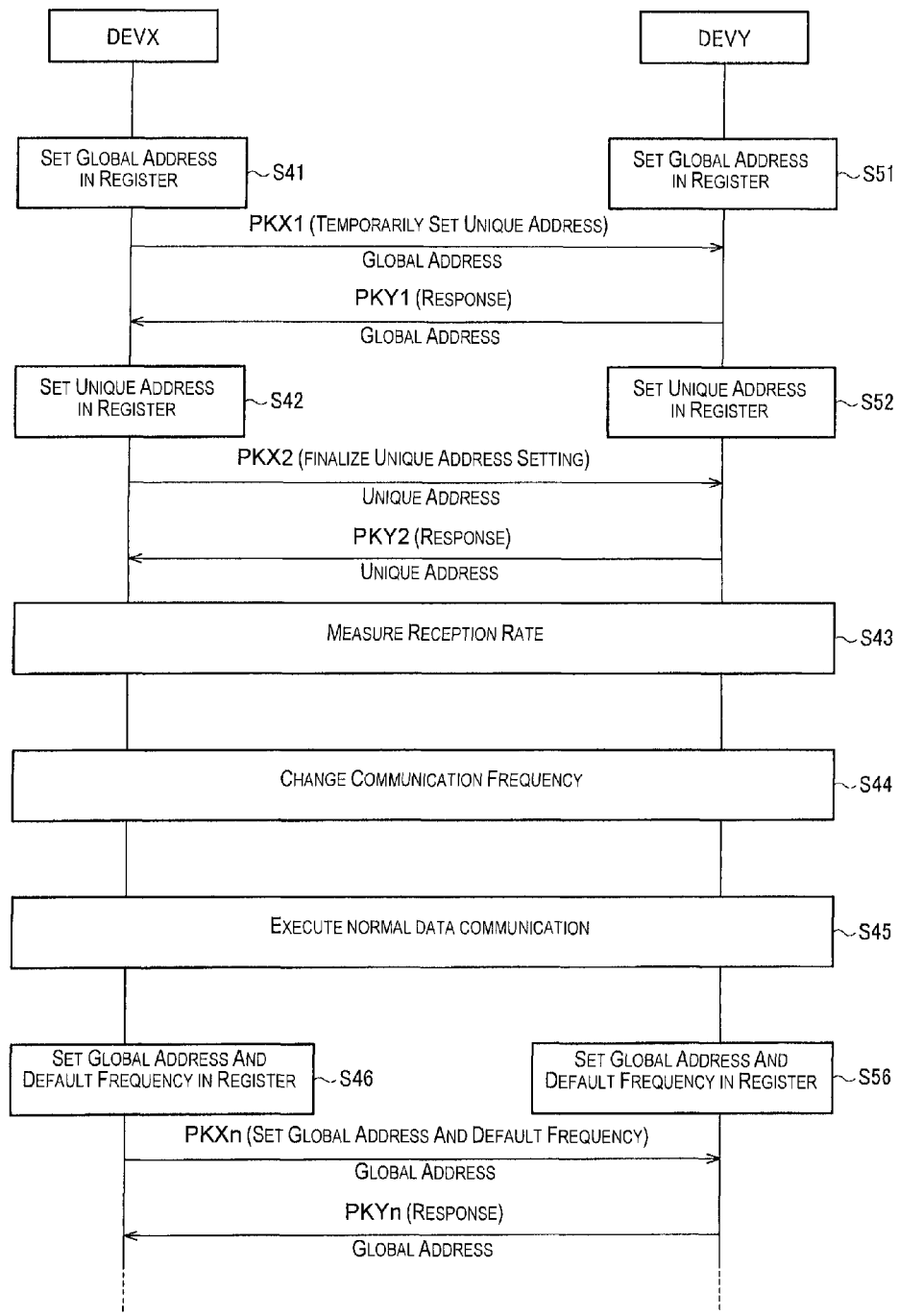
FIG. 9 is a communication sequence diagram explaining detailed operations executed in the embodiment during normal data communication.

FIG. 9 is a communication sequence diagram explaining detailed operations executed in the embodiment during normal data communication.

The devices DEVX and DEVY then set the global address to the registers (S41 and S51). Next, the device DEVX transmits a packet PKX1 for temporarily setting a unique address and the device DEVY transmits a response packet PKY1. The destination determining addresses of the packets PKX1 and PKY1 are set to the global address. The devices DEVX and DEVY then set the temporarily set unique address to the registers (S42 and S52).

Thus, with this embodiment, when normal data communication starts, the devices transmit communication setting packets PKX1 and PKY1 having the global address set as the destination determining address.

Next, the device DEVX transmits a packet PKX2 for finalizing a unique address setting and the device DEVY transmits a response packet PKY2. The destination determining addresses of the packets PKX2 and PKY2 are set to the unique address.

A reception rate is measured (S43) and a communication frequency is changed (S44) based on the reception rate measurement result. For example, if the reception rate of the device ID group is below a prescribed percentage (e.g., smaller than 80%), then the communication frequency is changed to the frequency of another open channel associated with that device ID group as will be explained later with reference to FIGS. 12 A and 12 B. Thus, even if inter-signal interference is occurring, the amount of communication time required for downloading a prescribed data size can be held to within a prescribed amount of time.

Next, normal data communication is executed (S45). In the example shown in FIG. 3, exercise data and other measurement data are communicated as normal data. When the normal data communication process ends, the devices DEVX and DEVY set the global address and the default frequency to their registers (S46 and S56). Next, the device DEVX transmits a packet PKXn for finalizing the global address and the default frequency settings and the device DEVY transmits a response packet PKYn. The destination determining addresses of the packets PKXn and PKYn are set to the global address.

In this embodiment, when the find packet PKX1 is transmitted, the transmission power is set to the weaker power PW2 as shown in FIG. 7 so that the transmission range of the carrier waves is limited and unintended devices are prevented from being found as pairing candidates.

However, even if such a method is adopted, there are times when, for example, a plurality of measuring devices exists within an area surrounding the cradle 110 and there is still a possibility that inter-signal interference will occur in the process of communicating the find packet and the response packet. In particular, since the find packet is transmitted at the weaker transmission power P2, it has a low resistance to noise and there is a possibility that interference will occur.

Therefore, in this embodiment, a method is used in which the response times (transmission waiting times) of the response packets transmitted in response to the find packet are made to be different based on the device ID as shown in FIG. 10.

For example, as shown in FIG. 10, assume that a device DEVX transmits a find packet PKX1 and a device DEVY positioned adjacent to the device DEVX receives the find packet PKX1. The device DEVY calculates a response time based on its own device ID (S61). That is, it calculates the response time to be different in accordance with the value of the device ID. The device DEVY then determines if the calculated response time has elapsed (S62) and, if the response time has elapsed, transmits a response packet PKY1 in response to the find packet PKX1. A device ID for setting a unique address is set in the payload of the response packet PKY1 as explained previously. That is, the device DEVX receives the response packet PKY1 (having a different response time according to the device ID) from the device DEVY to be paired with and sets a unique address.

Thus, even if other devices exist near the device DEVX, the other devices will transmit response packets in response to the find packet at difference response times in accordance with their respective device IDs. As a result, inter-signal interference can be reduced with respect to the communication of response packets.

3.4 Automatic Acknowledgement (ACK) Reply

The automatic reply of acknowledgement executed by the wireless communication section 10 will now be explained in detail.

As shown in FIG. 11 A, when the wireless communication section 10 receives a packet from the wireless communication section 11 of another device it is communicating with, the wireless communication section 10 checks the CRC of the packet and determines if the receipt was successful or not. If it determines that the receipt was a success, then the wireless communication section 10 automatically sends an ACK (acknowledgement) reply to the other wireless communication section 11 and notifies the processing section 60 that the receipt was a success. For example, the wireless communication section 10 uses the register provided in the interface section 58 shown in FIG. 2 to notify the processing section of the successful receipt of the packet. Thus, since the processing section 60 is not involved in the acknowledgement reply, the processing load of the processing section 60 can be lightened.

Meanwhile, as shown in FIG. 11 B, if the wireless communication section 10 determines that the receipt of the packet from the other wireless communication section 11 failed, then the wireless communication section 10 does not immediately inform the processing section 60. Instead of sending an acknowledgement when the receipt of a packet fails, the wireless communication section 10 waits until the other wireless communication section 11 reattempts to transmit the same packet after a timer runs out. As a result, the wireless communication section 10 determines if the retransmitted packet PKT was received successfully or not.

If the packet fails to be received a prescribed number of times, then the wireless communication section 10 notifies the processing section 60 that the receipt of the packet failed. The processing section 60 sets the prescribed number of times to be used by, for example, by writing it in advance to the register provided in the interface 58 shown in FIG. 2.

Thus, the wireless communication section 10 does not notify the processing section 60 of the receipt failure immediately when a packet fails to be received and, instead, only notifies the processing section when the packet fails to be received a prescribed number of times. As a result, the processing section 60 can execute other processes until the failure of receipt is reported and the processing load of the processing section 60 can be lightened.

In this embodiment, as shown in step S22 of FIG. 7, the transmission power is set to the weaker power PW2 and the find packet PKX1 is transmitted when the pairing process starts. Since the transmission power is weak, the transmission has a low resistance to noise. Consequently, inter-signal interference can occur easily when a plurality of other devices exist near the devices transmitting the find packet. Thus, as shown in FIG. 11 B, a situation in which the communication of a packet fails and retransmission of the packet is executed repeatedly could easily occur.

However, with this embodiment, since the find packet PKX1 is a single packet, a large communication time loss will not occur even if the packet is transmitted repeatedly as shown in FIG. 11 B.

After the search packet PKX1 is transmitted using the weaker transmission power PW2, the transmission power is changed from PW2 to PW1 as shown in step S23 shown in FIG. 7 and transmission of the pairing process packets is executed. In this way, switching to the higher transmission power PW1 increases the resistance to noise and lowers the probability that a retransmission like that shown in FIG. 11 B will be executed. Since the majority of the pairing process packets are transmitted using the larger transmission power PW1, even if some communication time loss occurs due to a retransmission of the find packet PKX1, the communication time loss of the entire pairing process resulting from retransmission of the find packet PKX1 can be held to a minimum.

Additionally, in this embodiment, a field for a destination determining address is provided in the packet and a unique address generated based on the device ID is set as this destination determining address. Thus, even if there is interference caused by a physical intermixing of signals, the interference can be eliminated at a software level by setting the unique address as the destination determining address. Consequently, the communication time loss associated with retransmission of packet can be decreased even further.

3.5 Setting Communication Frequency Based on Device ID

In this embodiment, wireless communications are conducted using a communication frequency in a frequency band near 2.4 GHz. However, when a plurality of devices are positioned close to one another, inter-signal interference will occur easily if the same communication frequency is used to conduct wireless communications.

Therefore, in this embodiment, a method is adopted in which the communication frequency used by each of the devices is set based on the device ID of the device. More specifically, the communication frequency used is set based on the device ID of each of the devices, the devices are divided among first to Nth device groups based on the device IDs, and first to Nth communication frequencies are assigned respectively to each of the device groups. The find packet and other packets are communicated at each of the first to Nth communication frequencies.

FIG. 12 A illustrates an example in which the devices are divided into first to eighth device groups (more broadly, first to Nth device groups) based on the device IDs. The first to eighth device groups correspond to channel numbers 1 to 8 shown in FIG. 12 A.

First to eighth communication frequencies (more broadly, first to Nth communication frequencies) are assigned to the first to eight device groups. In the example shown in FIG. 12 A, the first device group (channel number=1) is assigned a first frequency of 2402 MHz, and the second device group (channel number=2) is assigned a second frequency of 2404 MHz. The third to eight device groups are assigned frequencies in a similar fashion.

Which of the first to eight device groups each device belongs to is determined based on the device ID. More specifically, each of the devices is assigned to one of the first to eighth device groups by dividing its device ID by 8 and assigning the device to a group based on the resulting remainder. For example, in FIG. 12 A, the mod function "A mod B" is a function indicating the remainder that results when A is divided by B. Thus, devices for which the remainder is 0 when the device ID is divided by 8 belong to the first device group and are set to a communication frequency of 2402. Likewise, devices for which the remainder is 1 when the device ID is divided by 8 belong to the second device group and are set to a communication frequency of 2404. The other third to eight device groups are assigned frequencies in a similar fashion.

By dividing the devices into groups based on the device ID and setting a different communication frequency for each group, the occurrence of inter-signal interference can be suppressed effectively even if there are a plurality of devices existing nearby.

Additionally, since the communication frequency assigned to each of the device groups is varied based on a measurement result of a reception rate as explained regarding steps S43 and S44 of FIG. 9, this embodiment accomplishes a further suppression of inter-signal interference.

For example, in FIG. 12 B, the default communication frequencies assigned to the first to eighth device groups are 2402, 2404, . . . , 2416 MHz, respectively. However, if the reception rate is measured and found to be smaller than a prescribed percentage (e.g., below 80%), then the communication frequency is changed to a different channel. For example, the communication frequency of the first device group might be changed from 2402 MHz to 2422 MHz, 2442 MHz, or 2462 MHz. Likewise, the communication frequency of the second device group might be changed from 2404 MHz to 2424 MHz, 2444 MHz, or 2464 MHz. The frequencies of other third to eight device groups are changed in a similar fashion.

By changing the communication frequency in this way, each of the devices can conduct wireless communication at an optimum communication frequency in accordance with the particular inter-signal interference circumstances and the wireless communication quality can be improved.

4. Electronic Device

Figure 13A:
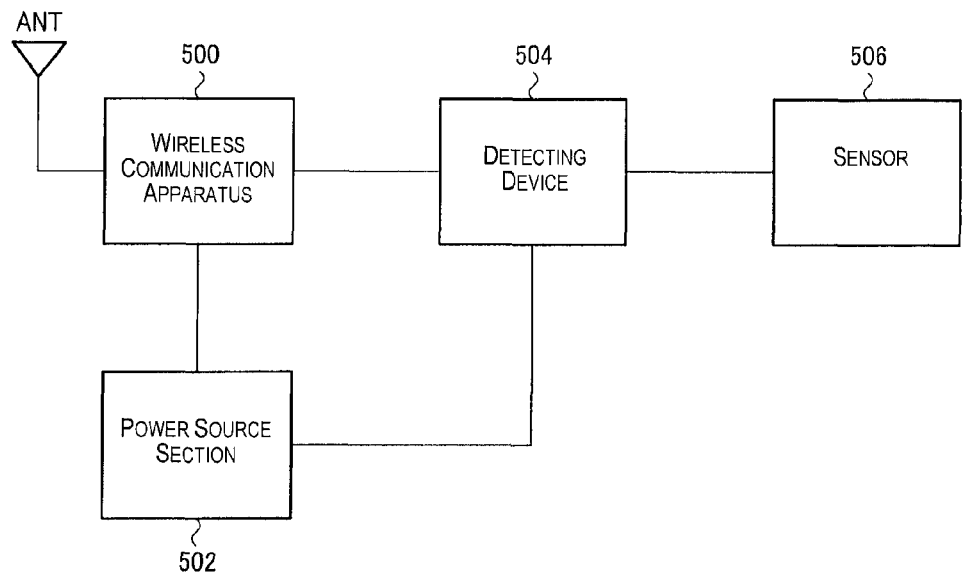
FIGS. 13 A and 13 B are block diagrams of electronic devices that include a wireless communication apparatus according to the embodiment.
Figure 13B:
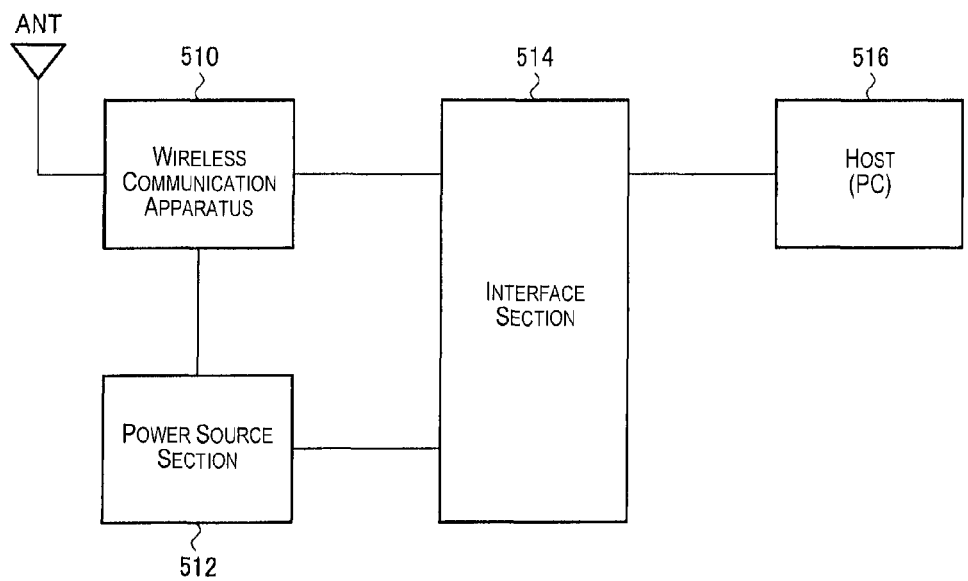

FIGS. 13 A and 13 B are block diagrams showing basic constituent features of an electronic device that includes a wireless communication apparatus 500 or 510 according to this embodiment. An electronic device according to this embodiment is not limited to the constituent features shown in FIGS. 13 A and 13 B) and various changes are possible. For example, a portion of the constituent elements can be omitted and/or other constituent elements can be added.

The electronic device shown in FIG. 13 A includes a wireless communication apparatus 500, a power source section 502, a detecting device 504, and a sensor 506. Such an electronic device might be, for example, the measuring device 100 shown in FIG. 3.

The wireless communication apparatus 500 executes such tasks as receiving signals through the antenna ANT and transmitting signals through the antenna ANT. The detecting device 504 executes various detection operations (detects physical quantities) based on sensor signals from the sensor 506 (physical quantity transducer). For example, the detecting device 504 detects a prescribed signal from the sensor signal, executes an A/D conversion, and outputs the resulting digital data. The sensor 506 includes, for example, a pulse sensor, a smoke sensor, a light sensor, a motion sensor, a pressure sensor, a biosensor, or a gyroscopic sensor. The power source section 502 employs, for example, a dry cell (coin battery) or other battery and serves as a power source for the wireless communication apparatus 500 and the detecting device 504.

The electronic device shown in FIG. 13 B includes a wireless communication apparatus 510, a power source section 512, and an interface section 514. Such an electronic device might be, for example, the cradle 110 shown in FIG. 3.

The wireless communication apparatus 510 executes such tasks as receiving signals through the antenna ANT and transmitting signals through the antenna ANT. The power source 512 uses electric power supplied, for example, from an AC power source or from a host 516 through the interface 514 (e.g., VBUS power of a USB connection) as a power source to supply electric power to the wireless communication apparatus 510. The interface section 514 is, for example, a USB connection and serves as an interface between the electronic device and an external host 516.

Although an embodiment is described in detail herein, it should be clear to those skilled in the art that many variations can be conceived without departing from the new matter and effects of the invention in a substantive way. Thus, such variations are included in the scope of the invention. For example, in the specification and the drawings there are some terms that are presented at least once together with other terms that have a broader meaning or the same meaning. Each of these terms can be replaced with the corresponding other term at any location in the specification and drawings. The constituent features and operation of the wireless communication circuit and the electronic device are not limited to those described in the embodiment and numerous variations are possible.

What is claimed is:

1. A wireless communication apparatus, comprising:
   a transmitter circuit whose transmission power is set variably;
   a wireless communication section having a receiver circuit; and
   a processing section configured to execute a control of the wireless communication section,
   the processing section being further configured to
      set the transmission power of the transmitter circuit to a first transmission power when it executes normal data communication, and
      set the transmission power of the transmitter circuit to a second transmission power smaller than the first transmission power when it executes a pairing process,
   the processing section being further configured such that
      during an initial stage of the pairing process, the processing section sets the transmission power of the transmitter circuit to the second transmission power while it communicates a find packet for finding a device to be paired, and
      after the find packet has been communicated, the processing section sets the transmission power of the transmitter circuit to a third transmission power larger than the second transmission power and communicates a pairing process packet for executing the pairing process,
   the processing section being further configured to
      set a unique address that designates a specific paired device as a destination determining address in a packet used for the normal data communication, and
      set a global address that does not designate a specific device as the destination determining address in the find packet,
   the processing section being further configured such that
      after it has communicated the find packet, the processing section sets the transmission power of the transmitter circuit to the third transmission power, communicates a communication setting packet in which the global address has been set as the destination determining address, and sets the unique address using the communication setting packet.

2. The wireless communication apparatus of claim 1, wherein
   the processing section is configured such that when a device to be paired with transmits a response packet after having received the find packet, the processing section sets the unique address based on a device ID set in the response packet.

3. The wireless communication apparatus of claim 2, wherein
   the processing section is configured to set the unique address by receiving the response packet having a different response time in accordance with the device ID from a device to be paired with.

4. The wireless communication apparatus of claim 1, wherein
   an address holding register that holds the destination determining address is further provided, and the processing section is configured such that the process of setting the unique address includes transmitting the communication setting packet having the unique address set in its payload to the device to be paired with and writing the unique address to the address holding register.

5. The wireless communication apparatus of claim 4, wherein the processing section is configured to set a communication frequency to be used in the payload of the communication setting packet and transmit the communication setting packet to the device to be paired with.

6. The wireless communication apparatus of claim 4, wherein the processing section is configured to write the global address to the address holding register when the pairing process ends.

7. A wireless communication apparatus, comprising:

a transmitter circuit whose transmission power is set variably;

a wireless communication section having a receiver circuit; and a processing section configured to execute a control of the wireless communication section, the processing section being further configured to set the transmission power of the transmitter circuit to a first transmission power when it executes normal data communication, and set the transmission power of the transmitter circuit to a second transmission power smaller than the first transmission power when it executes a pairing process, the processing section being further configured such that during an initial stage of the pairing process, the processing section sets the transmission power of the transmitter circuit to the second transmission power while it communicates a find packet for finding a device to be paired, and after the find packet has been communicated, the processing section sets the transmission power of the transmitter circuit to a third transmission power larger than the second transmission power and communicates a pairing process packet for executing the pairing process, the processing section being further configured to set a unique address that designates a specific paired device as a destination determining address in a packet used for the normal data communication, and set a global address that does not designate a specific device as the destination determining address in the find packet, the processing section being further configured such that when the normal data communication starts, the processing section communicates a communication setting packet in which the global address is set as the destination determining address.

\* \* \* \* \*